United States Patent [19]
Gänswein et al.

[11] Patent Number: 6,028,707
[45] Date of Patent: Feb. 22, 2000

[54] OPERATION MICROSCOPE WITH AN INTERFERENCE FILTER, AND INTERFERENCE FILTER

[75] Inventors: Bernhard Gänswein, Aalen; Andrea Mahler, Oberkochen; Gerhard Möller, Aalen; Petra Ludwig, Ochsenberg, all of Germany

[73] Assignee: Carl-Zeiss-Stiftung trading as Carl Zeiss, Germany

[21] Appl. No.: 09/134,481

[22] Filed: Aug. 14, 1998

[30] Foreign Application Priority Data

Aug. 18, 1997 [DE] Germany ............... 197 35 832

[51] Int. Cl.$^7$ ............... G02B 5/28; G02B 1/10; G02B 27/00; F21V 9/04
[52] U.S. Cl. ............. 359/589; 359/359; 359/577; 359/580; 359/581; 359/586; 359/588
[58] Field of Search .................. 359/577, 580, 359/581, 584, 585, 589, 359, 583, 586, 587, 588, 590

[56] References Cited

U.S. PATENT DOCUMENTS 5,923,471  7/1999  Wood, II et al. ............ 359/359

FOREIGN PATENT DOCUMENTS

| 0 510 919 A1 | 10/1992 | European Pat. Off. |
|---|---|---|
| 0 611 547 A1 | 8/1994 | European Pat. Off. |
| 0 814 350 A1 | 6/1997 | European Pat. Off. |
| 35 43 812 | 6/1987 | Germany |
| WO 94/09393 | 4/1994 | WIPO ............... G02B 5/08 |

OTHER PUBLICATIONS

Zycha, Harald. Refining Algorithm for the Design of Multilayer Filters. Applied Optics, vol. 12, No. 5, pP. 979–983, May 31, 1973.

Chemical Abstracts, vol. 111, No. 18, Oct. 30, 1989.

*Primary Examiner*—Cassandra Spyrou
*Assistant Examiner*—Jennifer Winstedt

[57] ABSTRACT

An operation microscope includes an illuminating device and an interference filter in the illuminating beam of the illuminating device. The interference filter is suitable for incorporation into the operation microscope. In order to prevent the yellow tinge that is present in long-known UV interference filters, the interference layer applied directly to the carrier substrate is a layer between 8 and 12 nm thick of yttrium fluoride, thorium fluoride, lanthanum fluoride or cerium fluoride.

10 Claims, 2 Drawing Sheets

6,028,707

OPERATION MICROSCOPE WITH AN INTERFERENCE FILTER, AND INTERFERENCE FILTER

BACKGROUND OF THE INVENTION

1. Field of the Invention

The invention relates to an operation microscope with an illuminating device, and more particularly to an illuminating device having an interference filter that is arranged in the illuminating beam path of the illuminating device, and also to a corresponding interference filter.

2. Discussion of Relevant Art

Such operation microscopes have been known for a long time in the prior art. The interference filters are provided in the illuminating beam path of the operation microscope in order to filter out certain spectral regions from the illuminating beam, for the protection of the patient illuminated with the illuminating beam, and/or the user of the operation microscope, from injurious radiation.

A recent advance, particularly in the technical field, has made it possible to filter out UV radiation with a wavelength of less than 408 nm from the illuminating beams of operation microscopes. For this purpose, a great range of variation in interference filters is known in the state of the art. In the course of research on the use of known interference filters for filtering out the UV radiation from the illuminating beam, it was established that all of the interference filters known to the inventor have the disadvantage that the illuminating beam acquires a yellow tinge due to the filtering, and thus an optimal illumination of the patient observed by means of the operation microscope is no longer possible.

SUBJECT OF THE INVENTION

The object of the invention is an interference filter for an operation microscope that filters out UV radiation without thereby producing a yellow tinge in the illuminating beam.

The object is attained by an interference layer that is applied directly to a carrier substrate, is between 8 nm and 12 nm thick, and is comprised of yttrium fluoride, thorium fluoride, lanthanum fluoride, or cerium fluoride.

The special advantage of such a layer is that the yellow tinge present in the UV filters that have long been known can be avoided.

A reflector is in fact already known from International Patent Document WO 94/09393, and is provided with a layer stack of alternating yttrium fluoride and zinc sulfide interference layers, for a two-color laser, namely in the example shown a helium-neon laser and $CO_2$ laser, which is set up so that electromagnetic waves both in the visible and in the infrared region, are reflected particularly advantageously. However, neither the 8–12 nm thick first layer, applied to the carrier substrate, of yttrium fluoride, cerium fluoride, lanthanum fluoride, or thorium fluoride, nor the specific following layer sequence, which have precisely the particularly desired effect that the yellow tinge is avoided, are to be derived from the International patent document.

The layer thickness of the interference layer applied directly to the carrier substrate varies in the present invention, firstly in dependence on the desired band edge of the interference filter and secondly in dependence on the material used. With a band edge of 408 nm and the use of yttrium fluoride, the layer thickness is 10 nm. When changing the band edge, the layer thickness varies proportionally to the band edge; when changing the material, the layer thickness changes in dependence on the optical path length, which is specific to the material. The mathematical relationships of interference filters have already been known for a long time to those skilled in this art, and therefore do not have to be expanded on further here.

In a development of the invention, the interference filter concerned additionally has at least one layer of zinc sulfide. This has the particular advantage that besides the filtering arising from the interference action, there is additionally an absorption action due to the zinc sulfide, since the zinc sulfide absorbs radiation relatively exactly in the region of 408 nm. The UV radiation can be filtered out of the illuminating beam particularly well by means of this effect.

The interference filter advantageously has eighteen or more interference layers, since a particularly steep band edge can thereby be attained.

BRIEF DESCRIPTION OF THE DRAWINGS

The invention will now be described, taken together with the drawings in which.

DETAILED DESCRIPTION OF PREFERRED EMBODIMENTS

Figure 1:
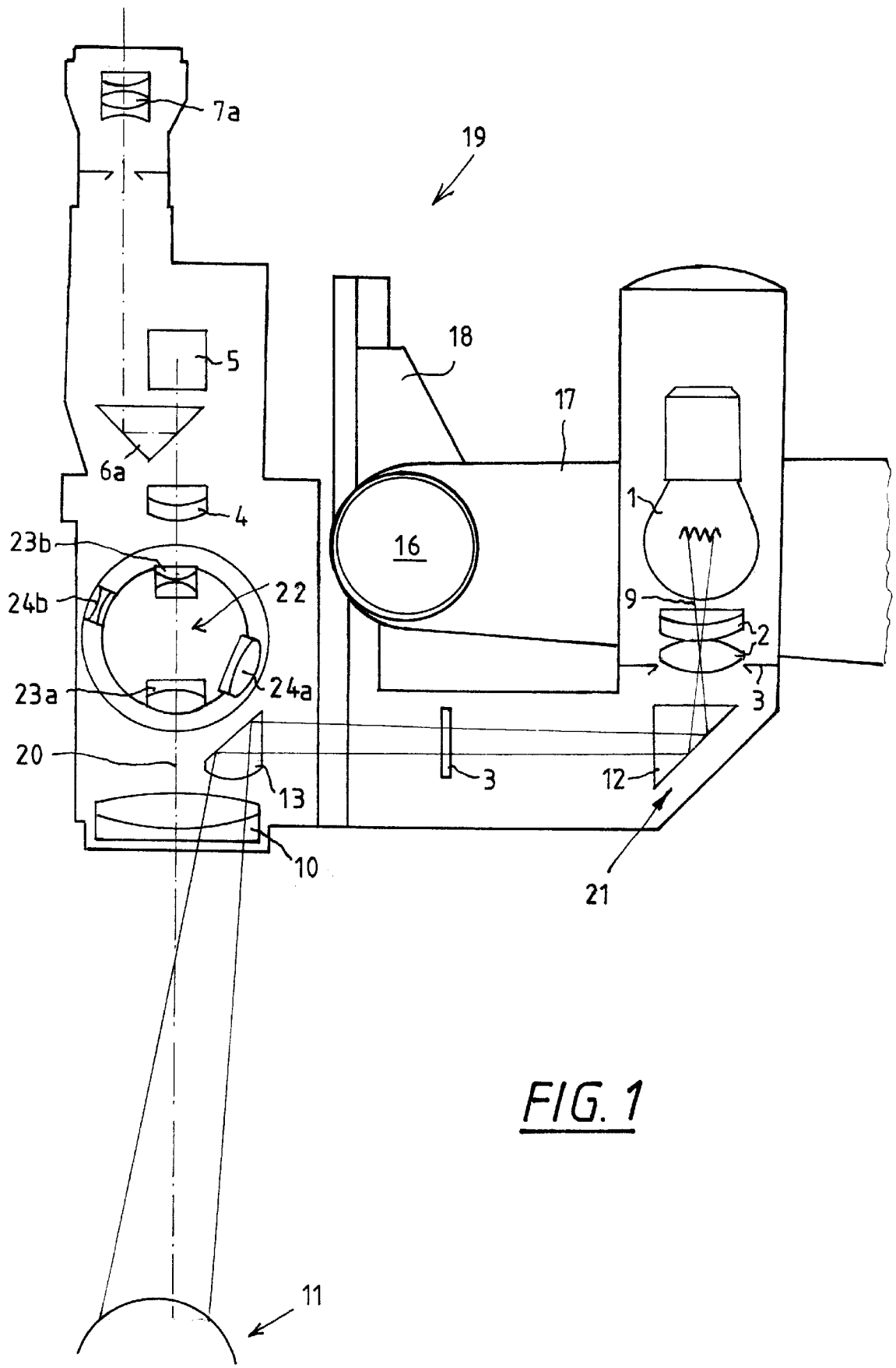
FIG. 1 shows an operation microscope in section, with an interference filter according to the invention.

FIG. 1 shows a schematic operation microscope (19) in cross section and not to scale. Such an operation microscope is shown, for example, on page 243 of the "Handbook for Ophthalmic Optics", published by Carl Zeiss, Oberkochen (1987), which is incorporated herein by reference.

The observation beam path of the operation microscope (19) will be described hereinbelow. Firstly, the observation beam of an object of observation (11), shown here only schematically, passes through the main objective (10) and the enlarger (23a, 23b, 4) which consists of three lenses, to the prism (5). The enlarger is here designed so that the enlargement can be altered, in that the two lenses (23a, 23b) contained in the enlargement changer (22) can be exchanged for the two other lenses (24a, 24b) by rotating the enlargement changer (22).

The beam which has now reached the prism (5) is divided there and is passed to the prisms (6a, 6b not shown here;), and can be observed by means of the eyepieces (7a, 7b not shown here;).

The operation microscope (19) is movably attached to a stand (not shown) by means of the elements (16–18).

The operation microscope (19) here has an illuminating device (21) for the illumination of the observation object (11) concerned. The light source of the illuminating device (21) is denoted by (1) here. The illuminating beam (9) emitted by the light source (1) is broadened here by a condenser system (2) and is passed to the observation object (11) via deflecting prisms (12, 13) and the main objective (10). The interference filter (3) according to the invention is located in the said observation beam (9), and serves to filter out the UV radiation from the illuminating beam (9). The specific structure of the interference filter (3) will now be described in more detail with reference to FIG. 2.

Figure 2:
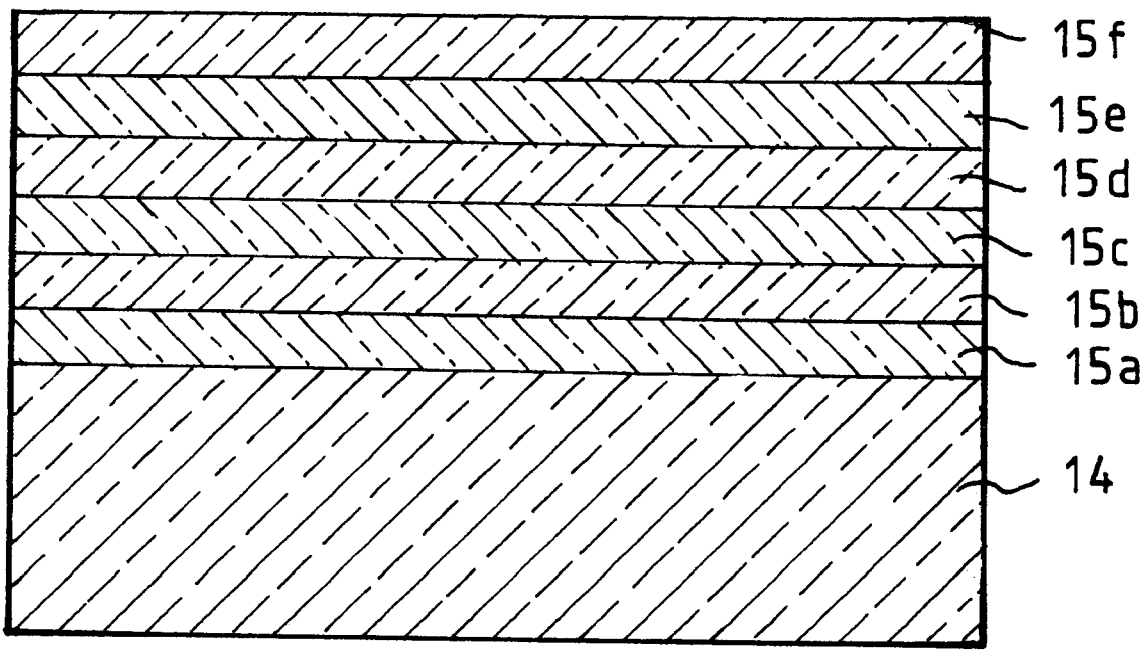
FIG. 2 shows an interference filter according to the invention, shown as an excerpt.

FIG. 2 shows, as an excerpt, in a purely schematic manner, a particularly advantageous interference filter according to the invention. A carrier substrate is denoted by (14). It should be said in general concerning the interference filter that the interference filter can be constructed as a transmission filter, as shown in connection with FIG. 1, so that the illuminating beam (9) passes through the filter (3). For this case, the carrier substrate (14) is made transparent and is prepared from glass or plastic, for example. Otherwise, the interference filter can of course be constructed as a reflection filter, so that the carrier substrate (14) is then constructed as a reflector. This can either take place by making the carrier substrate of silver, gold, or aluminum, for example, or in that another substrate such as glass or plastic, for example, is used and is provided with a corresponding reflecting layer. It should be expressly stated at this point that for this case the carrier substrate (14) is to be understood as the indicated combination of substrate and reflecting surface.

The construction of the layers (15a, 15b, 15c, . . . ) vapor deposited onto the carrier substrate (14) results as described hereinbelow.

First it should be said in this regard that FIG. 2 is also purely schematic and is not shown to scale, and that only the first six layers (15a–15f) are shown here, while the remaining 14 layers have been omitted for simplicity.

Since the described interference filter has 20 layers, Table 1 has been used for the description of the individual layers (15a, 15b, 15c, . . . ). The reference A here is substituted for a layer of yttrium fluoride, and the reference B is substituted for zinc sulfide.

TABLE 1

| Layer No. | Layer Ref. | Layer Material | Layer Thickness in nm |
|---|---|---|---|
| 1 | 15a | A | 10 |
| 2 | 15b | B | 15.12 |
| 3 | 15c | A | 59.98 |
| 4 | 15d | B | 31.88 |
| 5 | 15e | A | 59.95 |
| 6 | 15f | B | 31.88 |
| 7 | 15g | A | 59.95 |
| 8 | 15h | B | 31.88 |
| 9 | 15i | A | 59.95 |
| 10 | 15j | B | 31.88 |
| 11 | 15k | A | 59.95 |
| 12 | 15l | B | 31.88 |
| 13 | 15m | A | 59.95 |
| 14 | 15n | B | 31.88 |
| 15 | 15o | A | 59.95 |
| 16 | 15p | B | 31.88 |
| 17 | 15q | A | 59.95 |
| 18 | 15r | B | 31.88 |
| 19 | 15s | A | 59.95 |
| 20 | 15t | B | 14.42 |

The first layer (15a), of yttrium fluoride with a layer thickness of 10 nm, applied to the substrate (14) is here of decisive importance for the interference filter according to the invention. The layer concerned (15a) prevents in an explicit manner the long-known yellow tinge associated with UV interference filters.

As already stated hereinabove, a layer of thorium fluoride or of lanthanum fluoride or of cerium fluoride can of course be used instead of the yttrium fluoride layer. Correspondingly different layer thicknesses result here, of course, corresponding to the different path lengths for the layers concerned. The layer thicknesses can likewise also vary when, as already mentioned hereinabove, the band edge of the filter is to be altered.

We claim:

1. An operation microscope (19) comprising:

an illuminating device (21), and an interference filter (3) in an illuminating beam (9) of said illuminating device, wherein said interference filter (3) comprises at least one carrier substrate and at least one interference layer (15a) on said carrier substrate, which interference layer (15a) is between 8 and 12 nm thick and is selected from the group consisting of yttrium fluoride, thorium fluoride, lanthanum fluoride and cerium fluoride, and wherein said interference layer is applied directly to said carrier substrate.

2. The operation microscope according to claim 1, wherein said interference filter further comprises at least one zinc sulfide layer (15b).

3. The operation microscope according to claim 1, wherein said interference filter comprises at least 18 interference layers.

4. The operation microscope according to claim 1, wherein said interference layer is 10 nm thick.

5. The operation microscope according to claim 1, wherein said interference filter has the following sequence of layers, a layer of yttrium fluoride, thorium fluoride, lanthanum fluoride, or cerium fluoride is denoted by A, a layer of zinc sulfide is denoted by B, and the layer thickness is within plus or minus two nm:

| Layer No. | Layer Ref. | Layer Material | Layer Thickness in nm |
|---|---|---|---|
| 1 | 15a | A | 10 |
| 2 | 15b | B | 15.12 |
| 3 | 15c | A | 59.98 |
| 4 | 15d | B | 31.88 |
| 5 | 15e | A | 59.95 |
| 6 | 15f | B | 31.88 |
| 7 | 15g | A | 59.95 |
| 8 | 15h | B | 31.88 |
| 9 | 15I | A | 59.95 |
| 10 | 15j | B | 31.88 |
| 11 | 15k | A | 59.95 |
| 12 | 15l | B | 31.88 |
| 13 | 15m | A | 59.95 |
| 14 | 15n | B | 31.88 |
| 15 | 15o | A | 59.95 |
| 16 | 15p | B | 31.88 |
| 17 | 15q | A | 59.95 |
| 18 | 15r | B | 31.88 |
| 19 | 15s | A | 59.95 |
| 20 | 15t | B | 14.42 |

6. An interference filter (3) comprising:

at least one carrier substrate (14), and at least one interference layer (15a) applied directly to said carrier substrate, which interference layer is between 8 and 12 nm thick and is selected from the group consisting of yttrium fluoride, thorium fluoride, lanthanum fluoride and cerium fluoride.

7. The interference filter (3) according to claim 6, further comprising at least one zinc sulfide layer (15b).

8. The interference filter according to claim 6, comprising at least 18 interference layers.

9. The interference filter according to claim 6, wherein said interference layer is 10 nm thick.

10. The interference filter according to claim 6, wherein said interference filter has the following sequence of layers, a layer of yttrium fluoride, thorium fluoride, lanthanum fluoride, or cerium fluoride is denoted by A, a layer of zinc sulfide is denoted by B, and the layer thickness is within plus or minus two nm:

| Layer No. | Layer Ref. | Layer Material | Layer Thickness in nm |
|---|---|---|---|
| 1 | 15a | A | 10 |
| 2 | 15b | B | 15.12 |
| 3 | 15c | A | 59.98 |
| 4 | 15d | B | 31.88 |
| 5 | 15e | A | 59.95 |
| 6 | 15f | B | 31.88 |
| 7 | 15g | A | 59.95 |
| 8 | 15h | B | 31.88 |
| 9 | 15I | A | 59.95 |
| 10 | 15j | B | 31.88 |
| 11 | 15k | A | 59.95 |
| 12 | 15l | B | 31.88 |
| 13 | 15m | A | 59.95 |
| 14 | 15n | B | 31.88 |
| 15 | 15o | A | 59.95 |
| 16 | 15p | B | 31.88 |
| 17 | 15q | A | 59.95 |
| 18 | 15r | B | 31.88 |
| 19 | 15s | A | 59.95 |
| 20 | 15t | B | 14.42 |

* * * * *